United States Patent
Yang

(10) Patent No.: US 7,208,917 B2
(45) Date of Patent: Apr. 24, 2007

(54) SERIAL CHARGER WITH THE FUNCTION OF AUTOMATIC CHANGE OF CHARGING SPEED FOR NICD/NIH BATTERIES

(76) Inventor: Fu-I Yang, 5th Floor, 101, Hsin Pu 8th Street, Taoyuan City (TW)

( * ) Notice: Subject to any disclaimer, the term of this patent is extended or adjusted under 35 U.S.C. 154(b) by 130 days.

(21) Appl. No.: 11/103,569

(22) Filed: Apr. 12, 2005

(65) Prior Publication Data

US 2006/0226810 A1 Oct. 12, 2006

(51) Int. Cl.
*H02J 7/00* (2006.01)
(52) U.S. Cl. ..................... 320/160; 320/125
(58) Field of Classification Search ............... 320/125, 320/121, 152, 159, 160, 164
See application file for complete search history.

(56) References Cited

U.S. PATENT DOCUMENTS 5,396,163 A * 3/1995 Nor et al. ................ 320/159
5,825,155 A * 10/1998 Ito et al. ................ 320/118
2004/0135551 A1* 7/2004 Hoff et al. ............... 320/150

* cited by examiner

*Primary Examiner*—Karl Easthom
*Assistant Examiner*—Aaron Piggush
(74) *Attorney, Agent, or Firm*—Rosenberg, Klein & Lee

(57) ABSTRACT

A serial charger with the function of automatic change of charging speed for NiCd/NiH batteries is provided where the different charging modes for multi-speed (four speed) charging process, two speed charging process or two speed charging process in two charging phases can be achieved by use of the speed-changing principle with a low power consumption of an exchange power unit. The finished charging time of each battery varies inversely as the number of the detected batteries to be charged. No matter whether the charging voltage is variable or constant, the charging current varies automatically to achieve the speedy charging process or the normal charging process even under low power consumption. Accordingly, an exchange power unit can be reduced in size and built in the charger so that the charger is convenient to carry and the finished charging time can be adjusted automatically according to the demand of battery consumption of customers.

12 Claims, 15 Drawing Sheets

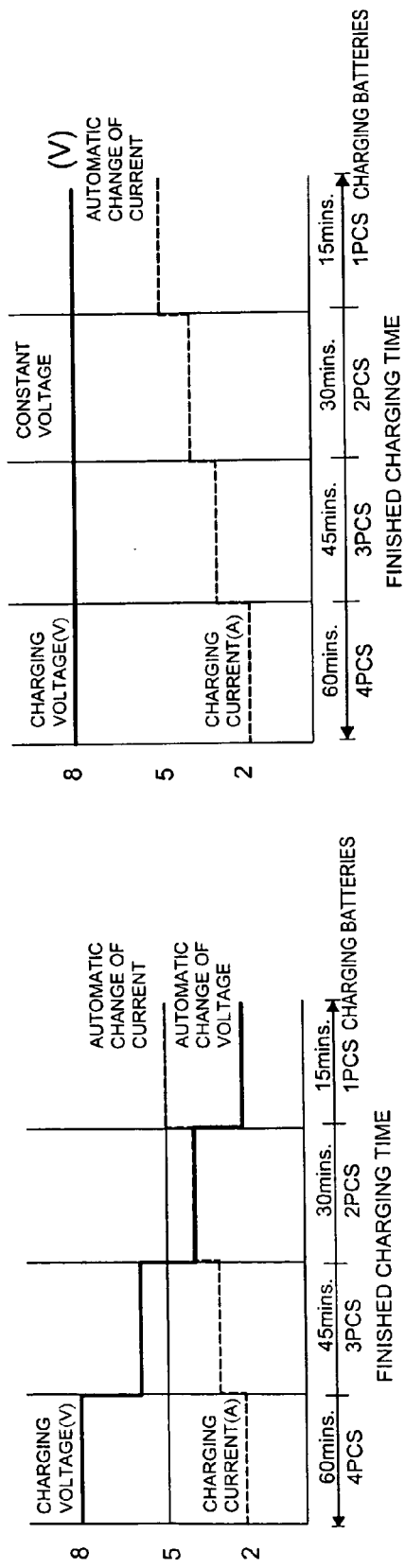

1-4PCS

FOUR-SPEED
CHARGING

SPEEDY CHARGING 1-2PCS

TWO-SPEED CHARGING

NORMAL CHARGING 3-4PCS

SERIAL CHARGER WITH THE FUNCTION OF AUTOMATIC CHANGE OF CHARGING SPEED FOR NICD/NIH BATTERIES

BACKGROUND OF THE INVENTION

1. Field of the Invention

The invention relates to a serial charger with the function of automatic change of charging speed for NiCd/NiH batteries, and more particularly to a charger with a speedy charging process that can be realized even on low power condition by use of the automatic speed changing principle. Accordingly, an exchange power unit can be reduced in size and built in the charger so that the charger is convenient to carry and the finished charging time can be adjusted automatically according to the demand of battery consumption of customers.

2. Description of the Related Art

With the increasing population of 3C portable electronic products, the demand on batteries increase proportionally. Because the normal unrechargeable batteries will be discarded after use, the operation cost will thus increase and it will also lead to the pollution of environment. Therefore, compared with the normal battery, the rechargeable battery (or so-called secondary battery) can reduce the cost and avoid pollution stemming from the battery. The quantity of rechargeable battery increased steadily and the demand on charging devices rises accordingly. But the normal charger for NiCd or NiH batteries employs either parallel charging principle or serial charging principle. For the parallel charging charger, the electronic control devices are difficult to select and couple, the requirements of instant charging process can not be met and it has defects.

The serial charging charger recharges several batteries in series with constant current and voltage. With the development of electronic technique, the charging type has evolved from the slow charging (more than 8 hours) in the beginning step to instant charging, which will also take four to five hours. Recently, the charger was developed with speedy charging or so-called super speedy charging process.

FIGS. 1 and 2 show a disassembled and an assembled diagram of a conventional instant charging device. Because it charges four serial batteries with constant current and voltage, the charging time of four batteries is identical, that is, it takes always four hours to charge four batteries or one battery. The user cannot adjust the charging time according to the number of batteries by himself. For the customers who urgently need batteries, this charging process is too slow. But this kind of instant charger 10 do have some advantages. Since its charging speed is not extreme, the needed power is not much. The exchange power unit 12 can be installed in the circuit board, and the plug 14, which connects to the AC current outside, can also be positioned under the housing 15. Because no outer transformer is needed, the whole size is thus fairly little and it is easy to carry and use.

A speedy charging device is an innovation aiming to further reduce the long charging time of the instant charger 10. It provides a big but constant current over the charging process of the secondary battery. We know that the current I and the time T are the significant factors for electric charge. That is to say, the battery electric capacity Q=current I×time T. In other words, the current I is inversely proportional to the time T when the capacity remains unchanged. Thus, when the charging current is increased, the battery will soon be fully charged, this is so-called speedy charger. But, by use this method, the power of inside exchange power source is considerably demanded, and the size of the coils in the transformer must be increased. As shown in FIG. 3, the exchange power source of this kind of a speedy charger 20 connects outside and forms an AC/DC transformer 21. The plug 22 or the plug 23 with extending cable connects to the power source. This charger is not convenient to take and its production cost will be raised.

We can conclude from the description above, that instant charger and speedy charger has also its advantages and defects. How the practical function of speedy charger as well as the low power and the small size of instant charger can be combined, is the subject which will be solved in the invention.

SUMMARY OF THE INVENTION

It is a primary object of the invention to provide a serial charger with the function of automatic change of charging speed for NiCd/NiH batteries through which the finished charging time is adjustable according to the demand on battery capacity.

It is another object of the invention to provide a serial charger with the function of automatic change of charging speed for NiCd/NiH batteries that can realize the function of speedy charging with low power consumption by use of the speed-changing principle. Therefore, the size of an exchange power unit can be reduced and this unit can be installed within the charger to make the charger convenient to carry as well as increase its operational functions.

In order to achieve the above-mentioned objects, a serial charger with the function of automatic change of charging speed for NiCd/NiH batteries, comprises:

a) a housing adapted to receive charging components, the housing having a charging groove with a charging series loop for charging a plurality of batteries, a plug extending from the housing for an electric connection to an alternating current (AC) source;

b) an exchange power unit disposed within the housing for converting AC into DC used for charging a plurality of series-connected batteries in the charging groove, the exchange power unit being adapted to provide a reference voltage to a charging control device;

c) a plurality of switches parallel-connected with corresponding charging loops of the batteries, a unilateral electronic element being interposed between each switch and the positive terminal of the corresponding battery; and d) a charging control device having a microcontroller with a time control unit and a battery quantity/voltage detection system; the time control unit being adapted to control separately the on/off state of each switch, the battery quantity/voltage detection system being adapted to detect separately the terminal voltage at a positive terminal of the batteries of the battery charging loops as well as to determine the number of the batteries to be charged, the microcontroller taking control of a voltage regulation unit and a current regulation unit, the current regulation unit being coupled to a current detection unit, whereby the charging current and voltage are determined by the number (N) of the detected batteries; meanwhile, the charging current varies automatically in inverse ratio to the battery quantity (N), and the current variation phases depend on the number (N) of the batteries to fulfill a multi-speed charging function, and the finished charging time is automatically adjustable according to the number (N) of the batteries.

The above-mentioned configuration further features:

1. The charging current and voltage are determined by the number (N) of the detected batteries, and an automatic change-over to a speedy charging process is done when the number of the detected batteries is less than two while an automatic change-over to a normal charging process is done when the number of the detected batteries is more than two; in this way, a two-speed charging function can be fulfilled in accordance with the number of the batteries to allow for an automatic change-over to different charging modes.
2. The charging control device commands the current partition unit to output respectively a bigger charging current to the first charging circuit to realize an extreme speed charging and a smaller charging current to the second charging circuit to carry out the instant charging, wherein, when the batteries in the first charging circuit are fully charged, the charging current will be shifted to the second charging circuit to carry out the extreme speed charging, thereby creating a two-phase speed-changing charging mode to allow for an automatic change-over to a speedy charging process and a normal charging process.

Therefore, by use of the speed-changing charging principle, the finished charging time of the batteries can be controlled separately. The double function of speedy and normal charging process can be realized without increasing the power of exchange power unit.

BRIEF DESCRIPTION OF THE FIGURES

The accomplishment of this and other objects of the invention will become apparent from the following descriptions and its accompanying figures of which:

FIG. 7 is a schematic diagram of the automatic variation of voltage and current of a first embodiment of the invention;

FIG. 8 is a schematic diagram of the automatic variation of current of the first embodiment of the invention;

DETAILED DESCRIPTION OF THE PREFERRED EMBODIMENT

Figure 1:
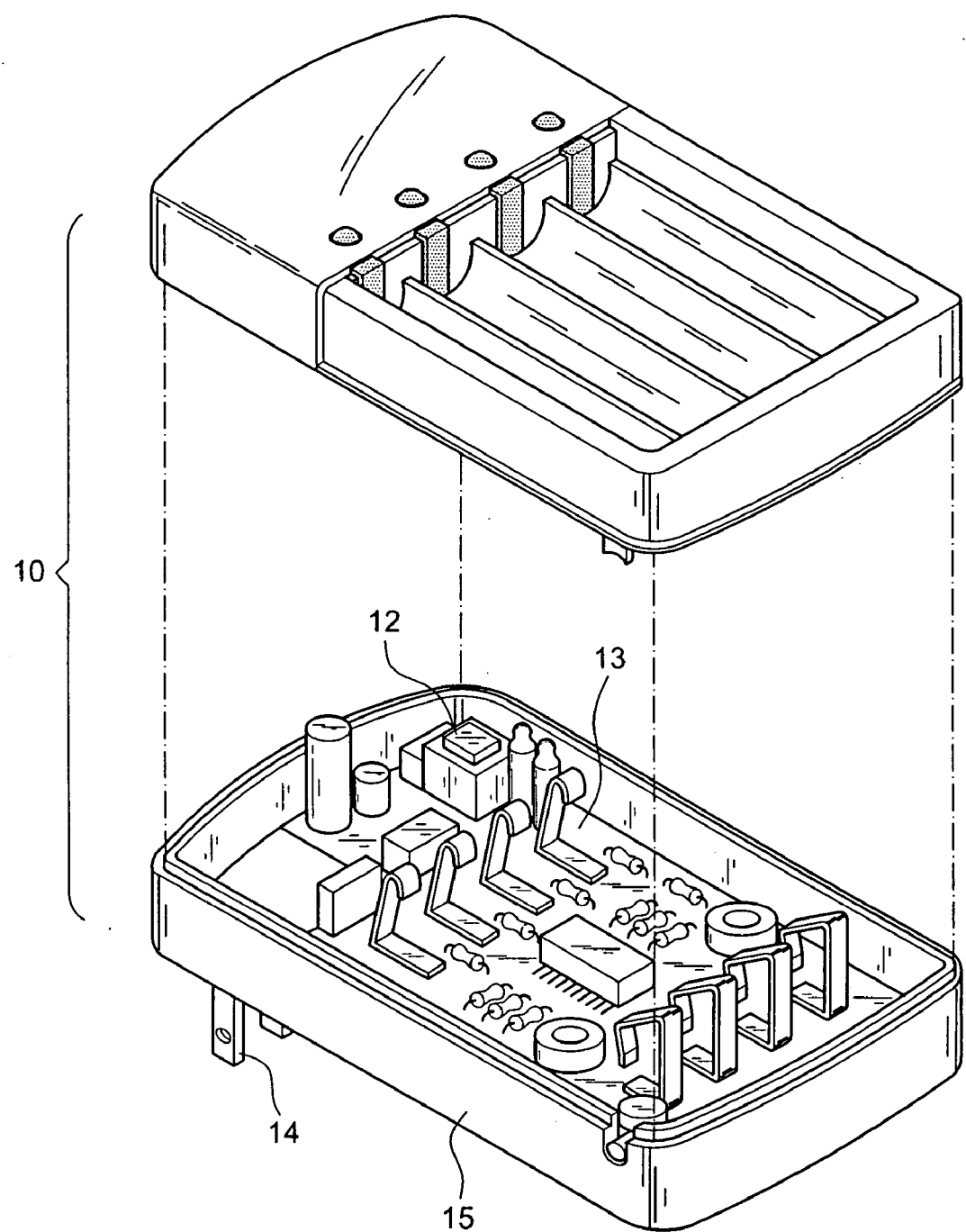
FIG. 1 is a perspective exploded view of a conventional instant charger.
Figure 2:
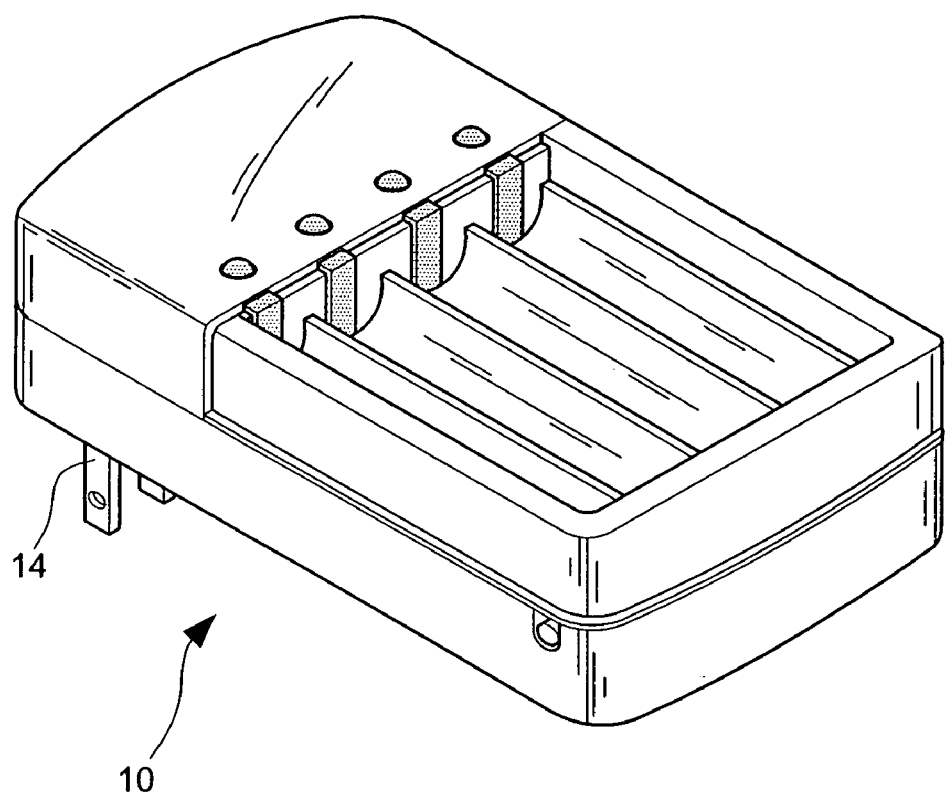
FIG. 2 is a perspective view of the conventional charger in accordance with FIG. 1.
Figure 3:
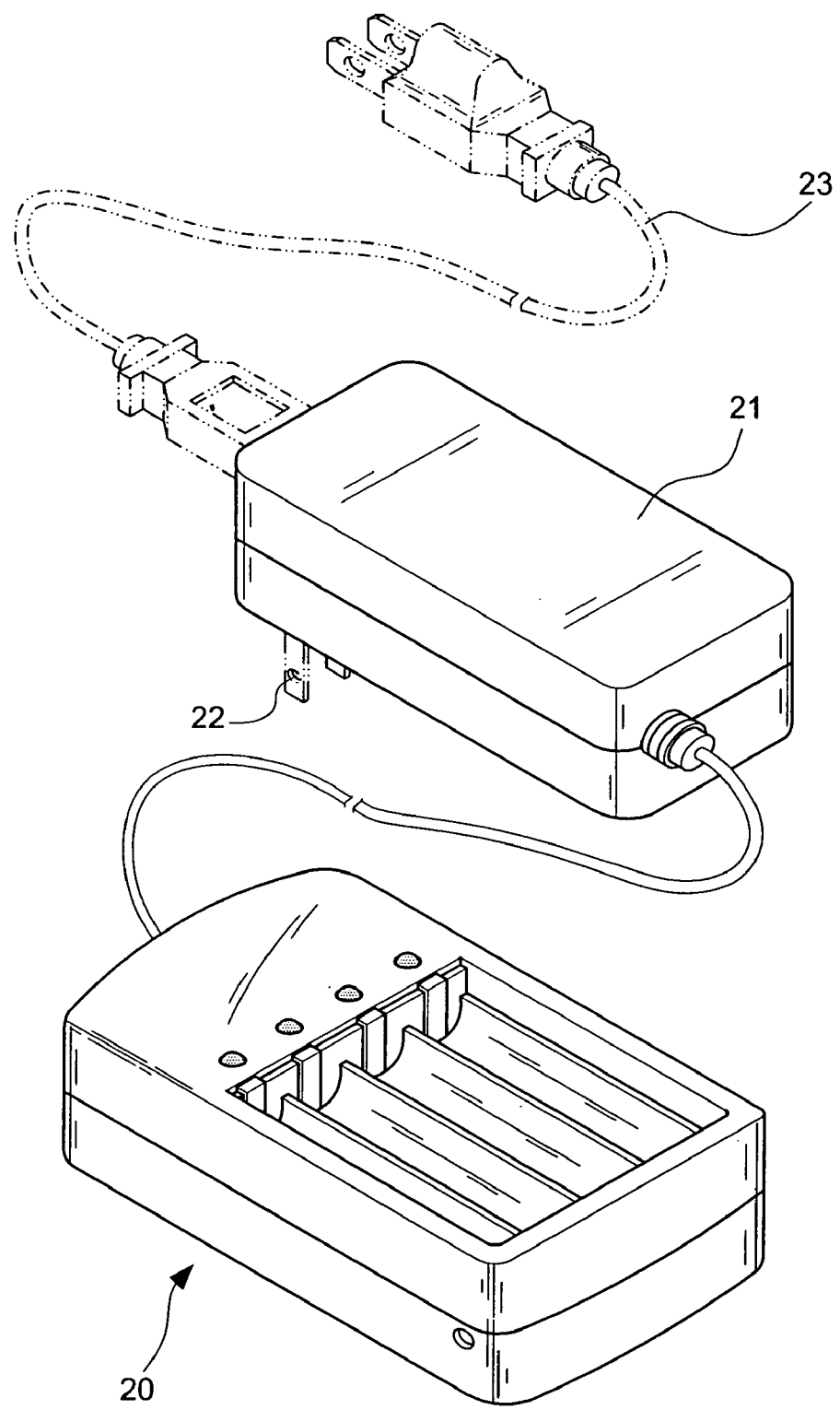
FIG. 3 is a perspective view of another conventional charger.
Figure 4:
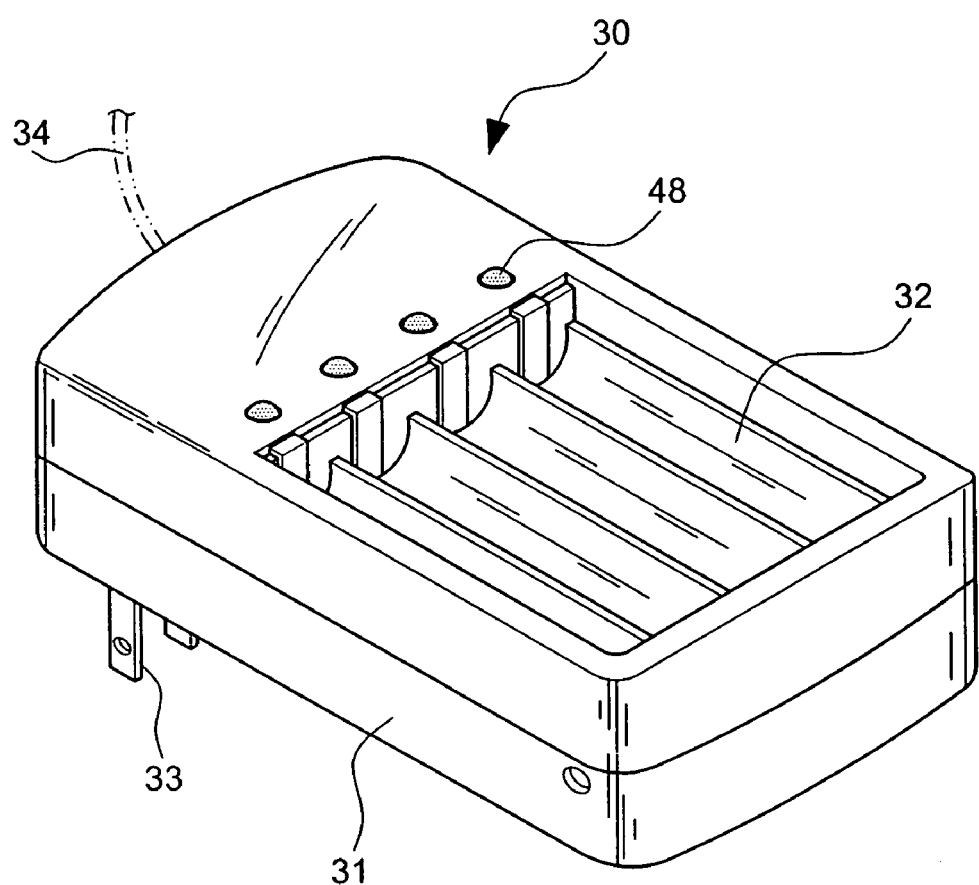
FIG. 4 is a perspective view of the invention.
Figure 5:
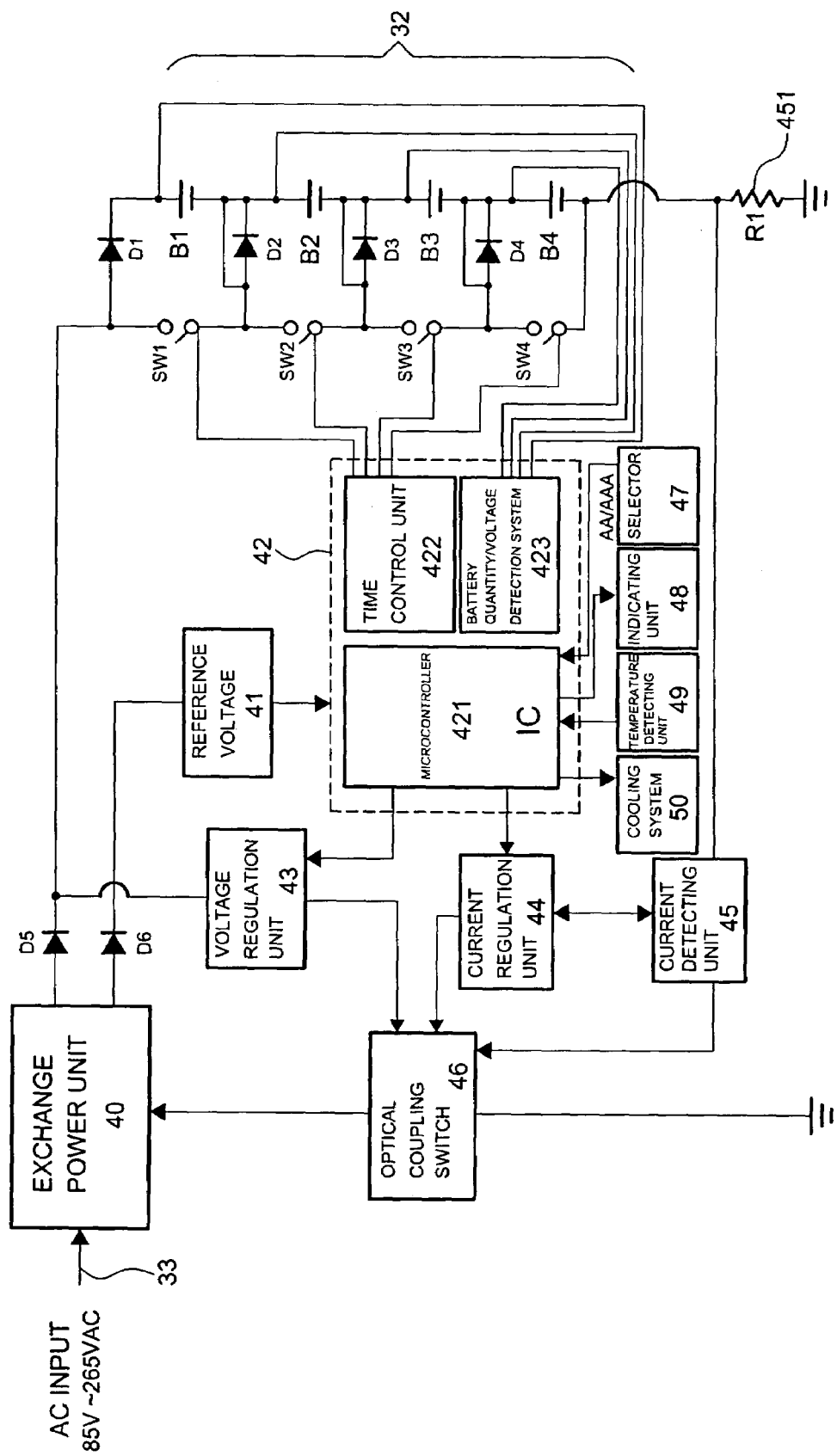
FIG. 5 is a circuit diagram of an applicable charging circuit of the invention.

At first, referring to FIG. 4, a speed-changing charger 30 in accordance with the invention has a similar size to a normal instant charger. The power of the built-in exchange power unit (not shown in FIG. 4) within a housing 31 is nearly identical to that of a normal instant charger. A plurality of charging grooves 32 are formed on the surface of the housing 31 for charging batteries. According to the embodiment shown in FIG. 4, four batteries can be simultaneously charged, but the number of the batteries to be charged is variable. A plug 33 is directly formed at a bottom side of the housing 31 to allow for an electric connection with AC power source. Alternatively, an extension cable 34 can be extended from one end of the housing 31. A transformer is not needed so that the charger size is small and it is easy to carry. However, how the speedy charging function can be realized with this low power exchange power source, is the unique design in the charging circuit of the invention. The invention features that the charging speed of the charger is variable and the charging time of each battery is individually controllable. Meanwhile, the finished charging time can be adjusted automatically according to the demand on battery capacity. The main charging circuit, as shown in FIG. 5, includes an exchange power unit 40:

The exchange power unit 40 is positioned within the housing 31. The supplied AC power is transmitted through a plug 33 to the exchange power unit 40. The AC will be converted firstly in DC for charging the serial batteries B1–B4 in the charging grooves 32. Each charging circuit for the batteries B1–B4 is connected with a switch SW1–SW4 in parallel, which are power MOSFET and other types are also applicable. A unilateral electronic element D1–D4 is interposed between the switch SW1–SW4 and the positive terminal of the four batteries B1–B4 which are diode or MOSFET. Other types are also applicable. The exchange power unit 40 provides a reference voltage 41 to a charging control device 42.

The charging control device 42 includes a microcontroller 421 that consist of a time control unit 422 and a battery quantity/voltage detection system 423. The time control unit 422 has three voltage detecting methods, $+\Delta V$, $0\Delta V$ or $-\Delta V$. Each voltage detecting method can control the ON and OFF of the switches SW1–SW4 separately. And the battery number/voltage detecting system 423 can also detect the voltage on the positive terminal of the charging circuits of the four above mentioned batteries B1–B4 individually and identify the number of charged batteries B1–B4.

Figure 6:
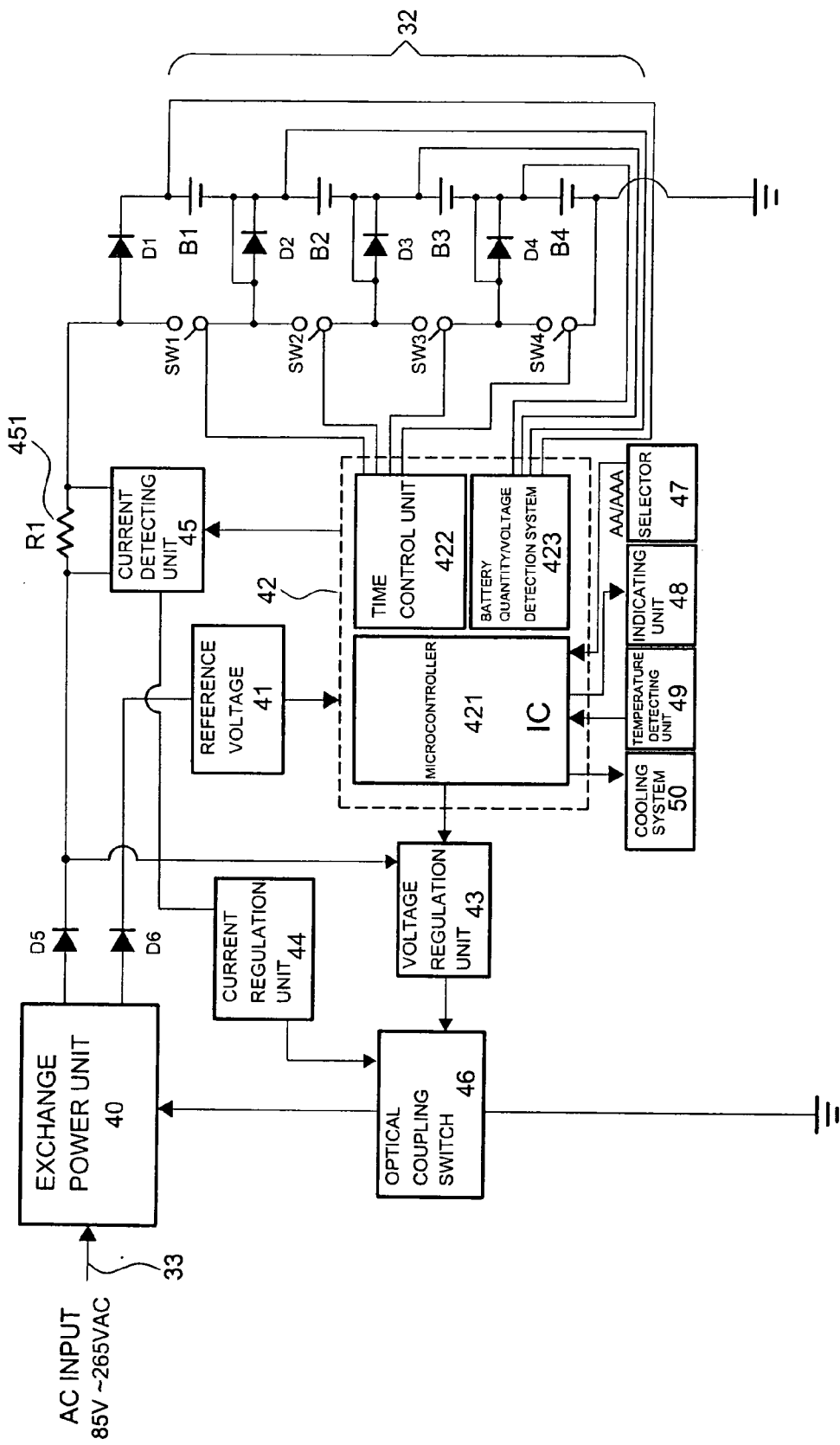
FIG. 6 is a circuit diagram of another applicable charging circuit of the invention.

And this microprocessor controls a voltage regulation unit 43 and a current regulation unit 44. The current regulation unit 44 is in connection with a current detecting unit 45. This current detecting unit 45 has an impedance 451 at the detection tip thereof. According to the embodiment in FIG. 5, the electrical resistance RI is configured as an impedance. And the detecting tip and the impedance 451 are positioned at the negative terminal of the battery charging circuit, but the design is not limited thereto. For example, as shown in FIG. 6, the detecting tip and the impedance 451 of the current detecting unit 45 can also be positioned at the positive terminal of the battery charging circuit. It is an equivalent variation, which will not be more described hereinafter. Moreover, two unilateral diodes are disposed at the output terminal of the exchange power unit 40. Furthermore, an optical coupling switch 46 is interposed between the current regulation unit 44 the voltage regulation unit 43.

Besides, this microcontroller 421 connects with an AA/AAA battery selector 47 and an indicating unit 48, which is disposed on the housing 31 to indicate the charging status. In accordance with the embodiment, the indicating unit 48 consists of several LEDs. Alternatively, LED can be replaced by LCD. Furthermore, the periphery of the microcontroller 421 includes a temperature detecting unit 49 and a cooling system with ventilators or cooling fins. However, the above mentioned four components are either conventionally used techniques or selective components which do not belong to the object of the invention and will not be more described hereinafter.

By use of the above-described technique, the change of current and voltage for the first embodiment of the speed-changing charger 30 is illustrated in FIG. 7. When the number of the batteries detected by the charging control device 42 is N, the speed changing charging mode will be converted into N-speed charging process. The charging grooves in the embodiment can hold four batteries, thus four charging speeds are available. This is to say, when four batteries should be charged, the charging time is set in 60 minutes and the current is 2 A and the voltage is 8V. When the batteries are reduced to three, the charging time will be reduced to 45 minutes, the current increased to 3 A and voltage reduced to 6V. The above mentioned charging time for four or three batteries is nearly identical to that of normal instant charger. When a speedy charging is required, the user should not put four batteries in the charging grooves, but only one or two batteries. In this way, the charging current will be increased automatically to 4 A or 5 A, and the voltage will be reduced to 4V or 2V. This means that the charging process for two batteries just take 30 minutes and for one battery just 15 minutes. When the customer does not need to use batteries urgently, he can charge four batteries at the same time. When he needs the battery urgently, he can just put two batteries or one battery into the charger to ensure a full charging of the batteries within a shorter time. Thus, in the first embodiment of the invention, the detected number N of batteries determines the charging voltage V and charging current A. The supplied charging current A is inversely proportional to the number N of batteries. The number of charging speed is determined by the number of batteries so as to allow for different charging speed modes. Accordingly, the finished charging time can be adjusted automatically in accordance with the battery number.

The charging voltage in above mentioned embodiment varies automatically according to the detected number of the batteries and in inverse ratio to the variation of charging current. Besides, as shown in FIG. 8, the charging voltage is constant and the charging current variable, which can also realize the speed-changing charging mode with four phases.

Figure 9:
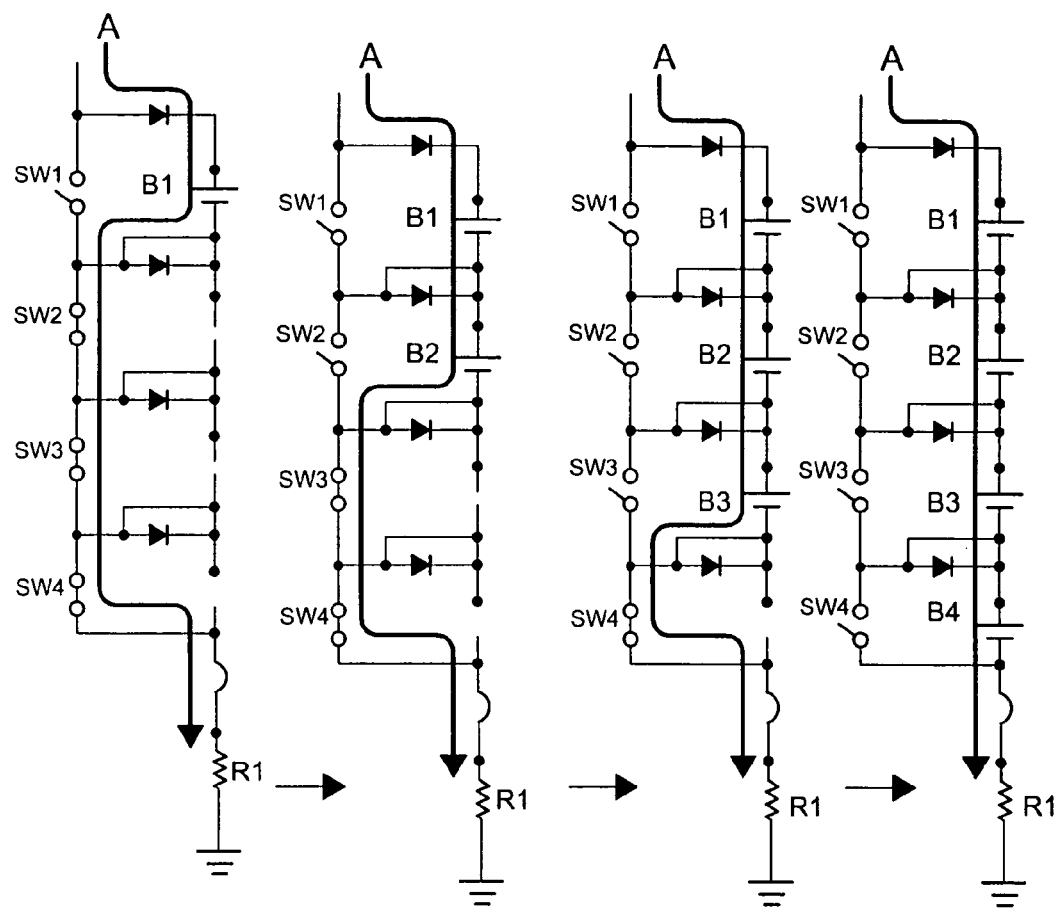
FIG. 9 is a schematic diagram of the four-speed charging of the first embodiment of the invention.
Figure 10:
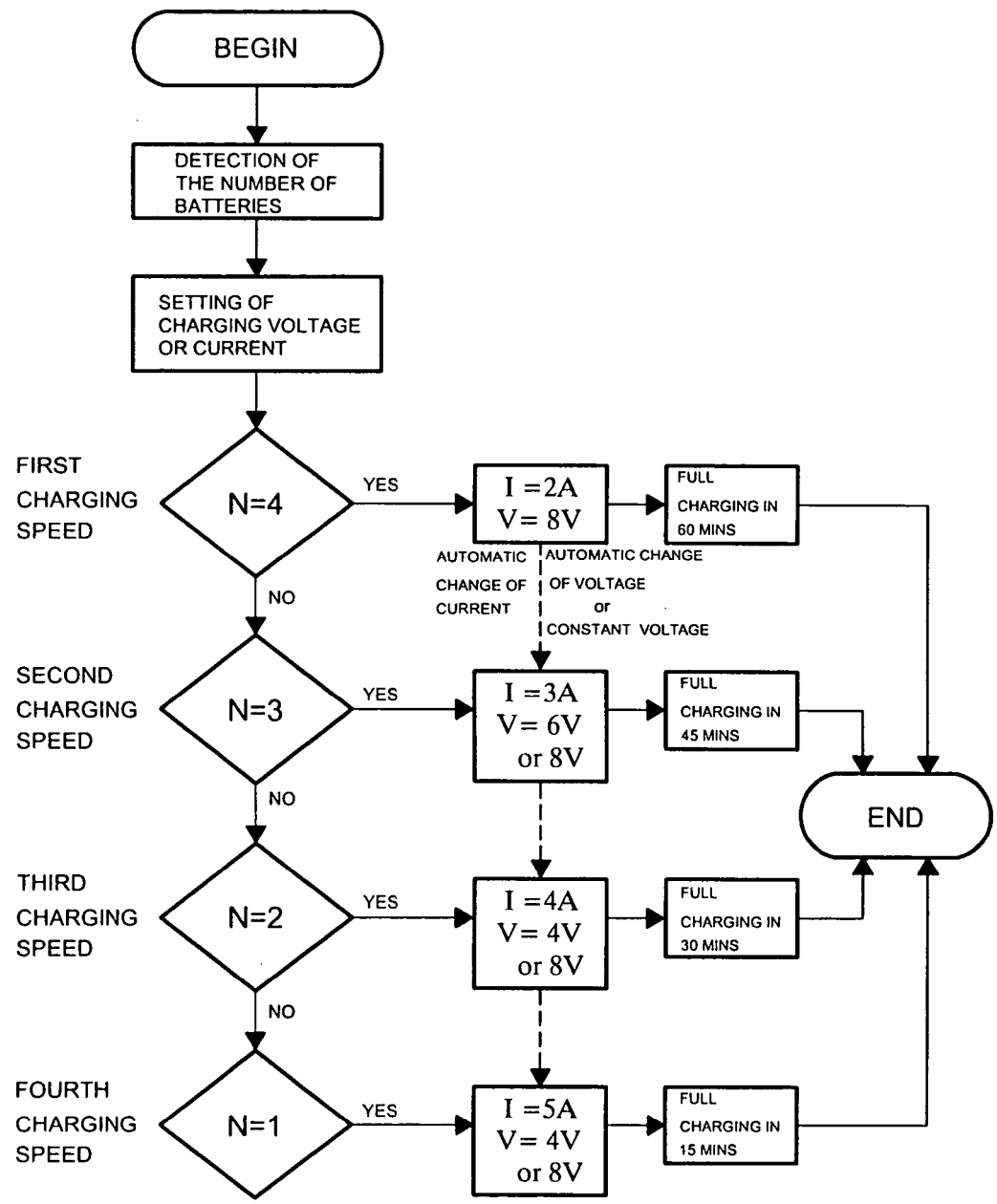
FIG. 10 is a flow diagram of the first embodiment of the invention.

FIG. 9 shows the charging diagram of the four-speed charging process in accordance with the invention. The switch SW1–SW4 control the charging time of each battery separately. When only one battery SB1 is charged, the switch SW1 is OFF and the other switches SW2–SW4 are ON, so that the charging current just flows to the battery B1. When two batteries B1, B2 are charged, thus, the switches SW1 and SW2 are OFF, SW3–SW4 are on. In this way, when four batteries B1–B4 are charged, the four switches SW1–SW4 are all OFF, and the charging current flows to four batteries to be charged. The four-speed charging mode in accordance with the invention is shown in FIG. 10. At first, the battery number N will be detected and then the current and voltage will be determined. When the battery number N is four, the charging current I is 2 A, the charging voltage V is 8V and the finished charging time is 60 minutes. When the detected battery number N is three, the second charging phase will be carried out, this means that the charging current I will be changed to 3 A automatically, the charging voltage V to 6V and the finished charging time is 45 minutes. In this way, when the detected battery number N is one, the fourth charging phase will be started and the charging current I is 5 A, the charging voltage V is 4V and the finished charging time needs only 15 minutes. In the fourth speed, a speedy charging function can be realized. The above described charging voltage V varies automatically and in inverse ratio to the charging current. It can also be preset, that is to say, the charging voltage remains unchanged at 8V and the four-speed charging function can be realized as well.

Figure 11:
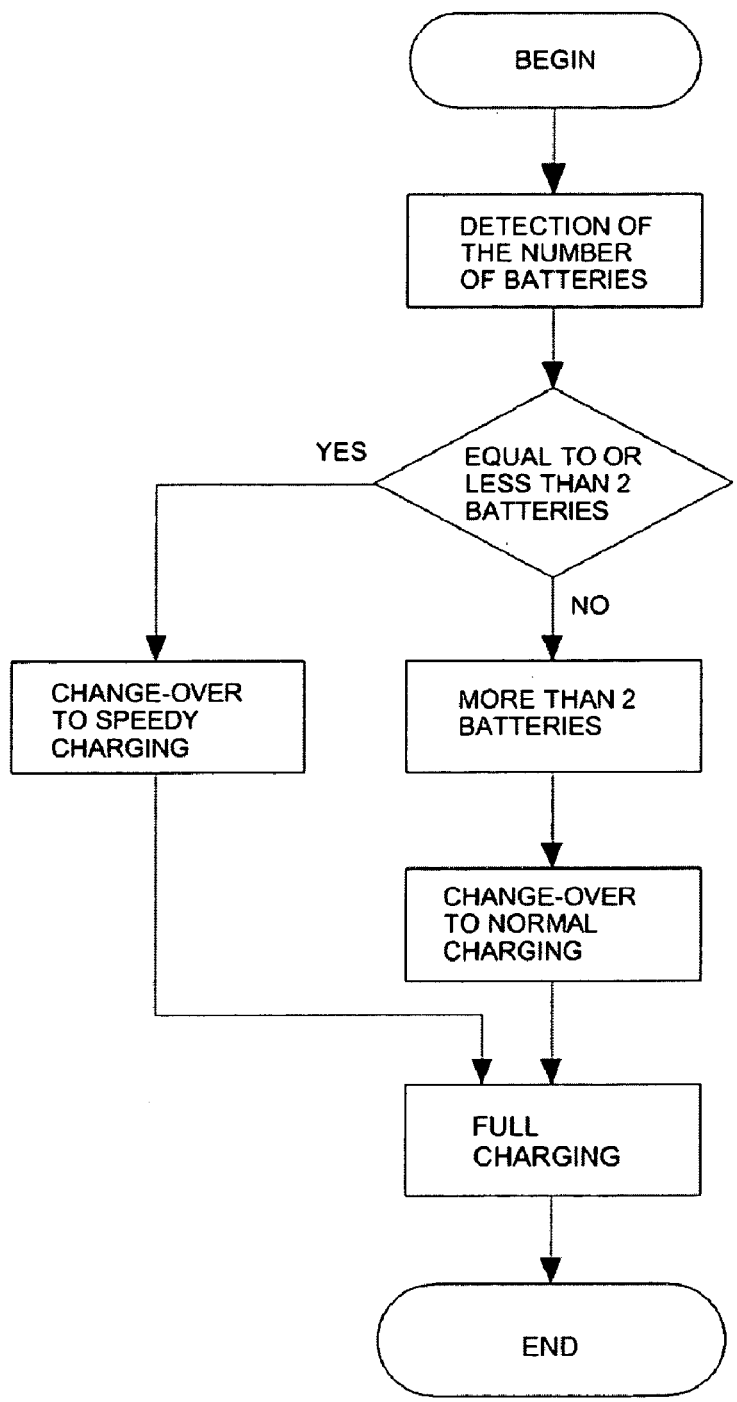
FIG. 11 is a flow diagram of a second embodiment of the invention.
Figure 12:
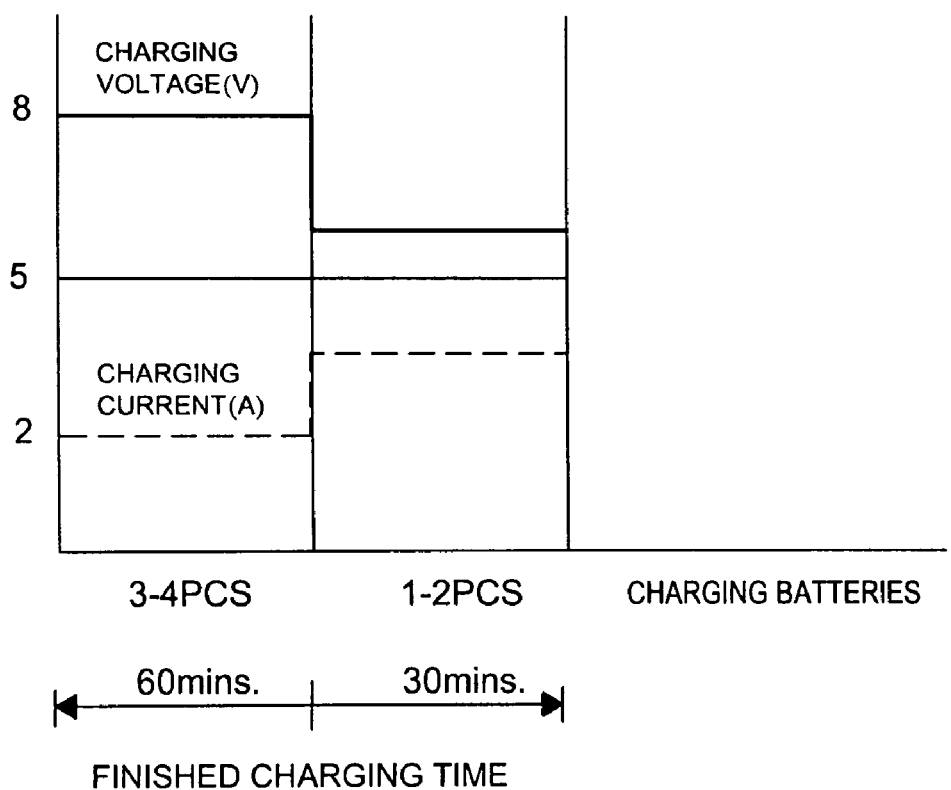
FIG. 12 is a schematic diagram of the charging voltage and current of the second embodiment of the invention.
Figure 13:
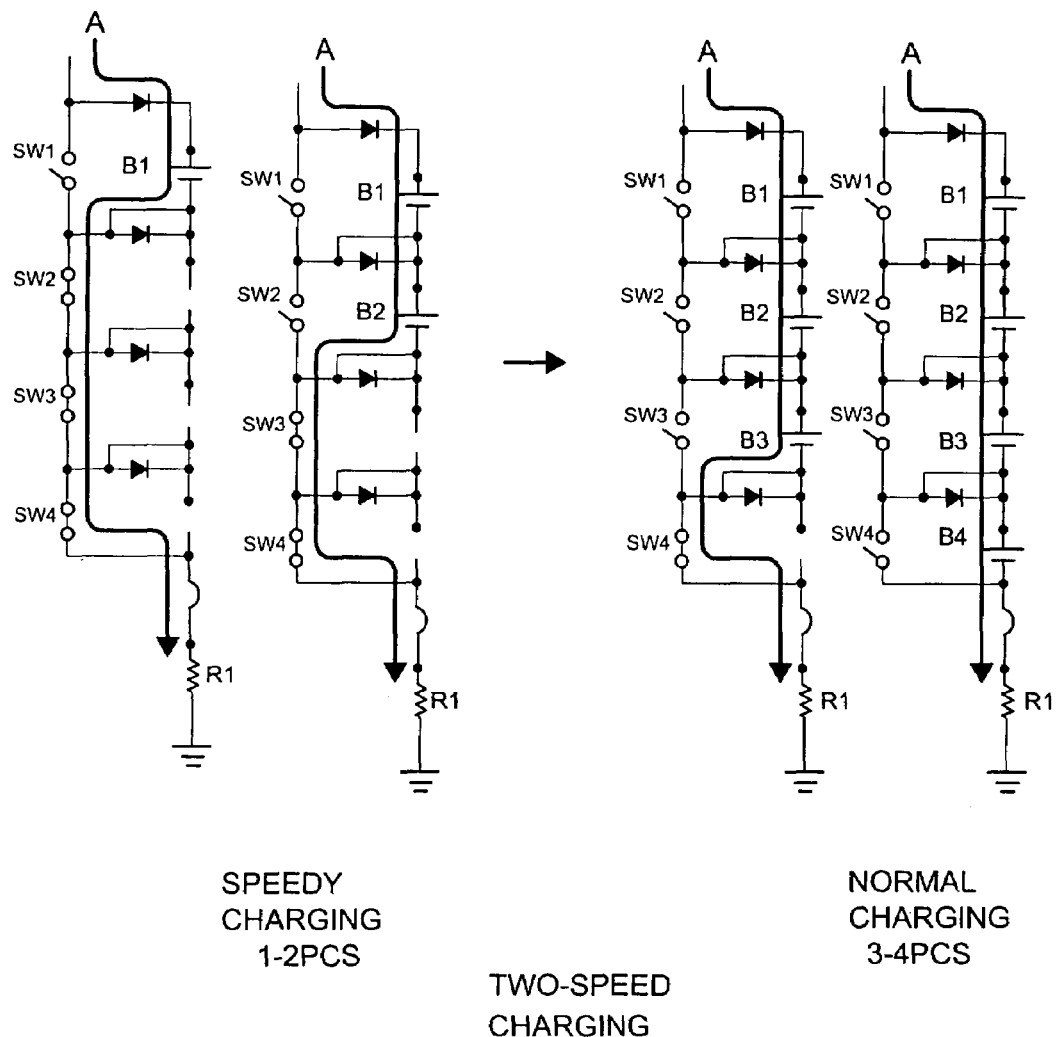
FIG. 13 is a schematic diagram of a two-speed charging of the second embodiment of the invention.

The four-speed charging mode has been described above. However, only two batteries are required in many cases. Hence, the second embodiment of the invention, which is shown in FIG. 11, employs the two-speed charging mode. At first, the battery number will be detected. When the battery number is less than two, the charging will be shifted into speedy charging process. And when the battery number is more than two, the charging will be shifted into normal charging. However, either in speedy charging status or in the normal charging status, the charging process will stop when the batteries are fully charged. The charging voltage and current change of two-speed charging process are shown in FIG. 12. That is to say, when three to four batteries are charged, the charging voltage is 8V, the charging current is 2 A and the finished charging time is 60 minutes. This is the normal charging process. When only one battery or two batteries are charged, the charging voltage will be reduced and the charging current will be increased and the speedy charging process will be realized so that the finished charging time can be reduced by 50%. The principle is identical to the four-speed charging mode and will not be more described hereinafter. The two-speed charging mode according to the battery number is demonstrated in FIG. 13.

Figure 14:
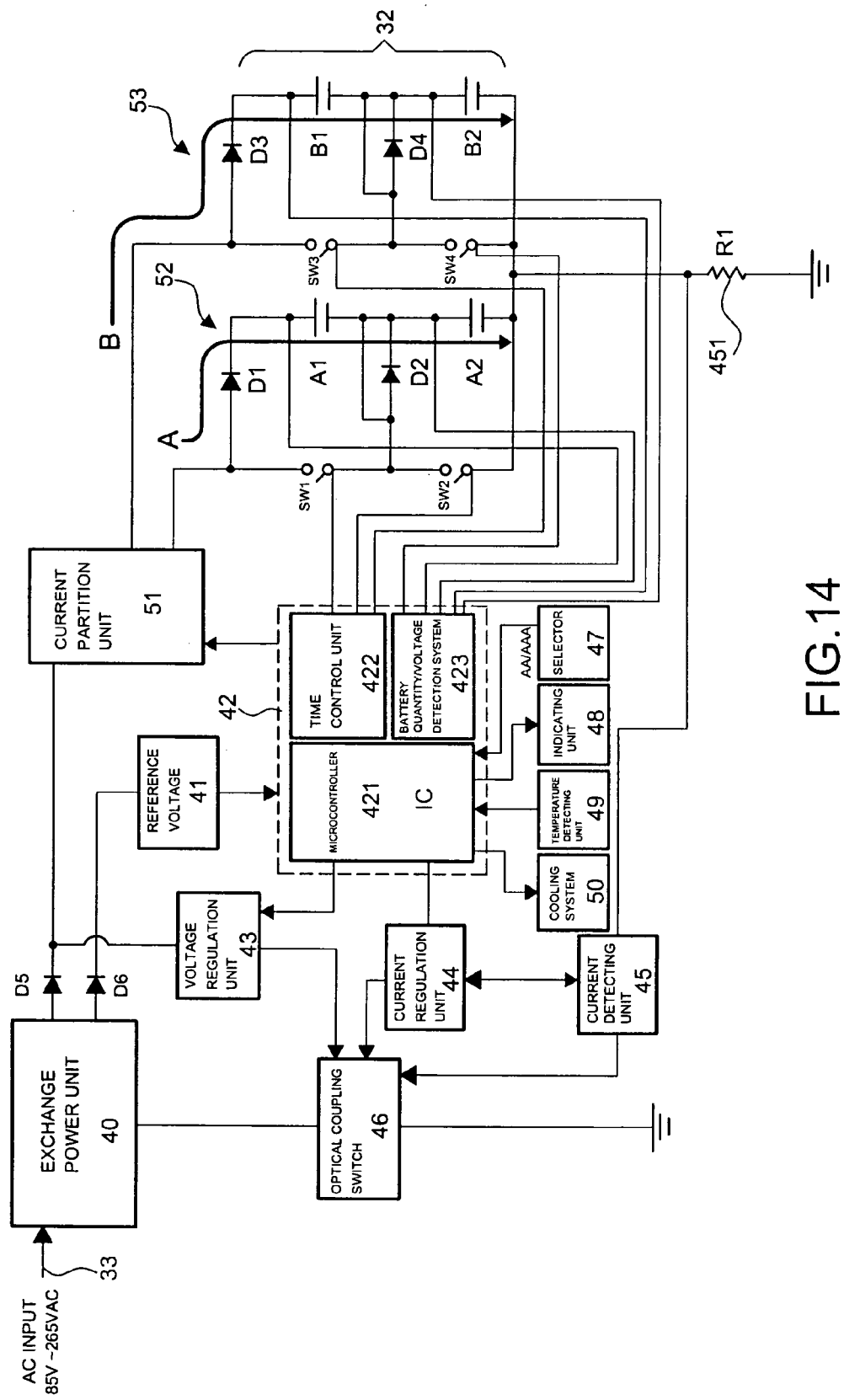
FIG. 14 is a circuit diagram of a further applicable charging circuit of the invention.
Figure 15:
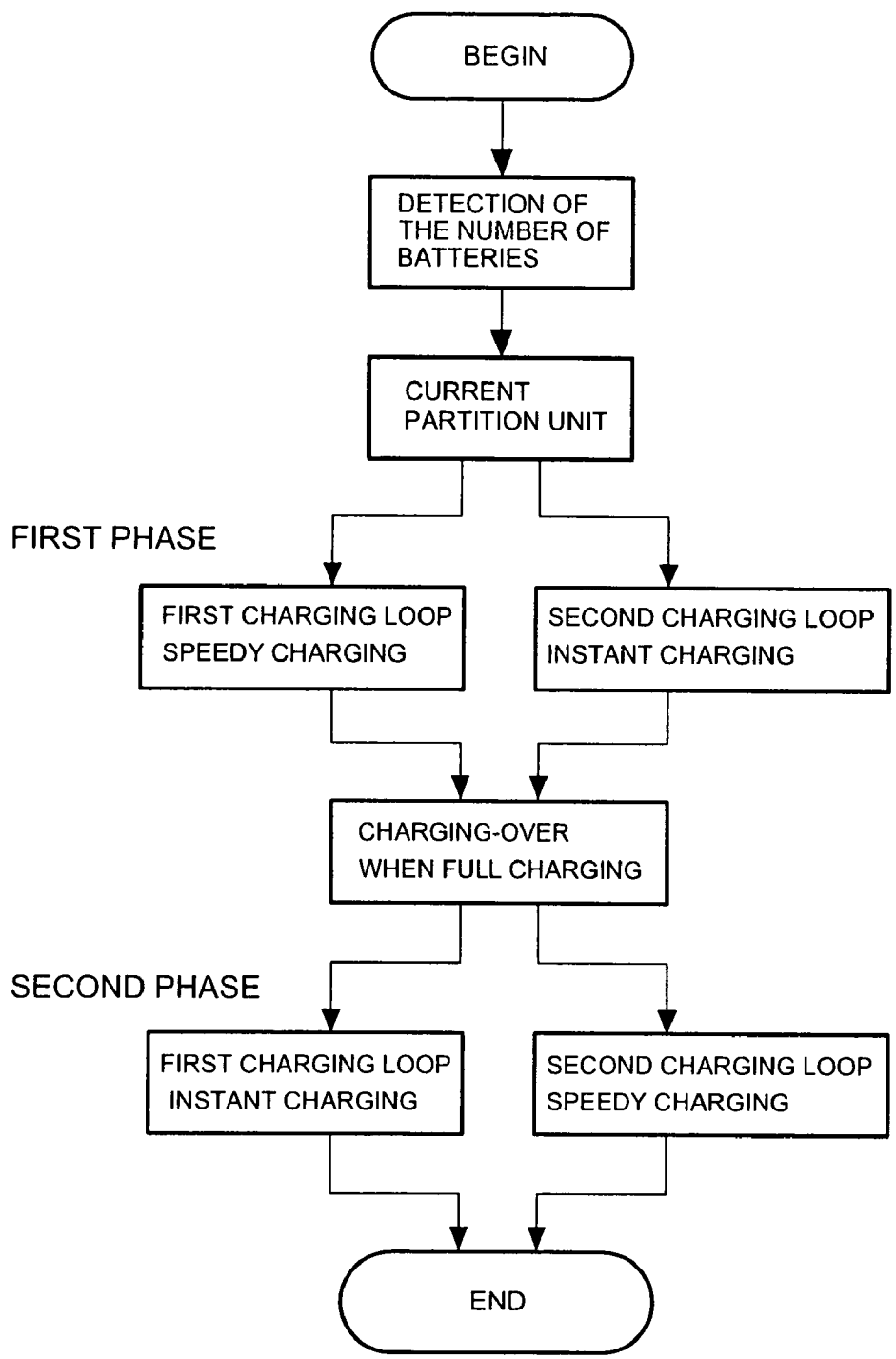
FIG. 15 is a flow diagram of a third embodiment of the invention.
Figure 16:
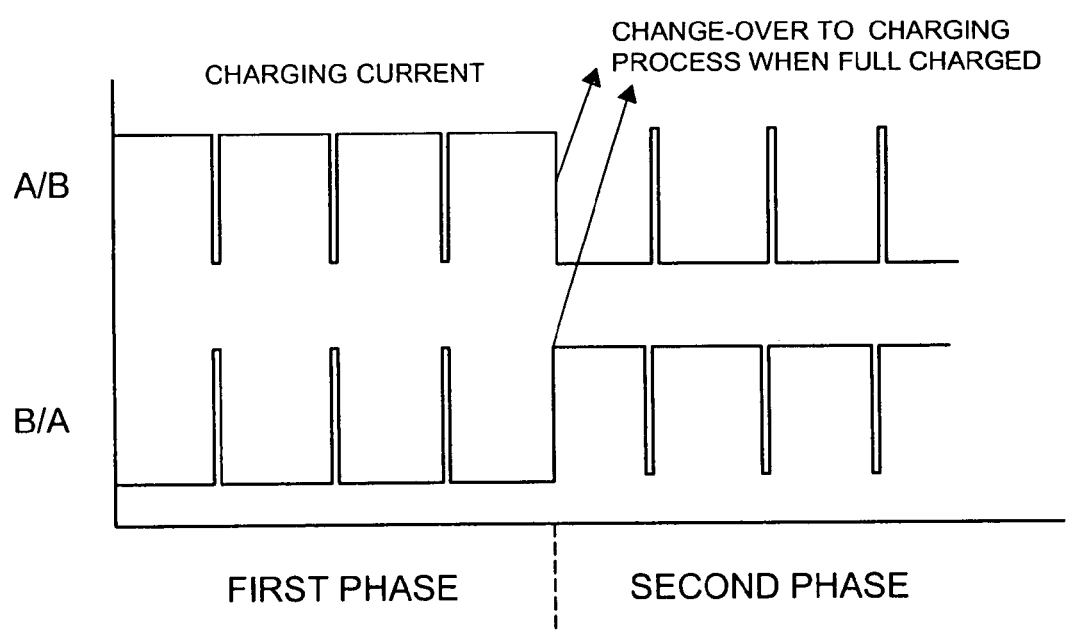
FIG. 16 is a schematic diagram of the charging voltage and current of the third embodiment of the invention.

The charging circuit of a third embodiment of the invention is shown in FIG. 14. The main structure is similar to the previous embodiments. The difference is that it has two charging grooves 32 in which the two batteries A1, A2 are connected in series, and the other two batteries B1, B2 are connected in series, then two sets are connected in parallel to form a first charging loop 52 and a second charging loop 53. As in the previous embodiments, the batteries A1, A2, B1, and B2 are also connected with a switch SW1–SW4, respectively. A unilateral electronic element D1–D4 is interposed between each switch and the positive terminal of each battery. Another difference lies in that, the direct current coming from the exchange power source 40 forms by control of a current partition unit 51 a first charging current A and a second charging current 11, which flow to the first charging circuit 52 and the second charging unit 53 respectively. The charging control device 42 commands the current partition unit 51 to output respectively a bigger charging current A to the first charging circuit 52 to realize the speedy charging and a smaller charging current B to the second charging circuit B to carry out the instant charging. When the batteries A1–A2 in the first charging circuit are fully charged, the charging current will be shifted to the second charging circuit to carry out the speedy charging (see FIG. 15). In this way, the charging process is divided into two phases while a speedy and an instant charging way are available. This charging process diagram is shown in FIG. 16. The characteristic of this embodiment is that, two batteries can be fully charged with extreme speed for the urgent case, the other two batteries can be charged with the normal charging process. After the first two batteries are fully charged, the normal instant charging of those two batteries will undergo the speedy charging process.

As described above, regardless of the multi-speed or two-speed charging modes or charging mode with two phases, the power of the exchange power unit 40 of the speed-changing battery charger in the invention remains in low power condition. The charging time of each battery is separately controllable by detecting the battery number. On the condition of constant or variable voltage, the charging current varies automatically to achieve the instant charging function or even a speedy charging can be achieved by low power consumption. Therefore, the size of the exchange power unit 40 can be reduced and this unit can be installed within of the housing 31 to entitle the charger 30 to be convenient to carry and use.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A serial charger with the function of automatic change of charging speed for NiCd/NiH batteries connected in series to allow for a multi-speed charging process in accordance with the number of the detected batteries, comprising:
   a) a housing adapted to receive charging components, the housing having a charging groove with a charging series loop for charging a plurality of batteries, a plug extending from the housing for an electric connection to an alternating current (AC) source;
   b) an exchange power unit disposed within the housing for converting AC into DC used for charging a plurality of series-connected batteries in the charging groove, the exchange power unit being adapted to provide a reference voltage to a charging control device;
   c) a plurality of switches parallel-connected with corresponding charging loops of the batteries, a unilateral electronic element being interposed between each switch and the positive terminal of the corresponding battery; and
   d) a charging control device having a microcontroller with a time control unit and a battery quantity/voltage detection system; the time control unit being adapted to control separately the on/off state of each switch, the battery quantity/voltage detection system being adapted to detect separately the terminal voltage at a positive terminal of the batteries of the battery charging loops as well as to determine the number of the batteries to be charged, the microcontroller taking control of a voltage regulation unit and a current regulation unit, the current regulation unit being coupled to a current detection unit, whereby the charging current and voltage are determined by the number (N) of the detected batteries; meanwhile, the charging current varies automatically in inverse ratio to the battery quantity (N), and the current variation phases depend on the number (N) of the batteries to fulfill a multi-speed charging function, and the finished charging time is automatically adjustable according to the number (N) of the batteries.

2. The serial charger with the function of automatic change of charging speed for NiCd/NiH batteries as recited in claim 1 wherein the charging voltage is variable in accordance with the number of the detected batteries and varies inversely as the charging current.

3. The serial charger with the function of automatic change of charging speed for NiCd/NiH batteries as recited in claim 1 wherein the charging voltage is constant.

4. The serial charger with the function of automatic change of charging speed for NiCd/NiH batteries with respect to recited in claim 1 wherein the switches are configured as metal oxide semiconductor field effect transistor (MOSFET) type while the unilateral electronic element is selected from a group that consists of diodes and MOSFETs.

5. The serial charger with the function of automatic change of charging speed for NiCd/NiH batteries as recited in claim 1 wherein the exchange power unit includes an output terminal in connection with two unilateral diodes, and a photo coupler is interposed between the exchange power unit and the current regulation unit as well as between the exchange power unit and the voltage regulation unit.

6. The serial charger with the function of automatic change of charging speed for NiCd/NiH batteries as recited in claim 1 wherein an AA/AAA battery selector and an indicating unit are coupled to the microcontroller, and wherein the indicating unit is disposed at a front side of the housing for indicating the charging status, and wherein the indicating unit is selected from a group that consists of LED and LCD.

7. The serial charger with the function of automatic change of charging speed for NiCd/NiH batteries as recited in claim 1 wherein a temperature detecting unit and a cooling system are coupled to the periphery of the exchange power unit, and wherein the cooling system is selected from a group that consists of ventilators and cooling fins.

8. The serial charger with the function of automatic change of charging speed for NiCd/NiH batteries as recited in claim 1 wherein an impedance is positioned at a detection terminal of the current detecting unit.

9. The serial charger with the function of automatic change of charging speed for NiCd/NiH batteries as recited in claim 8 wherein both the detection terminal of the current detecting unit and the impedance are positioned at a negative terminal of the battery charging loop.

10. The serial charger with the function of automatic change of charging speed for NiCd/NiH batteries as recited in claim 8 wherein both the detection terminal of the current detecting unit and the impedance are positioned at a positive terminal of the battery charging loop.

11. A serial charger with the function of automatic change of charging speed for NiCd/NiH batteries connected in series to allow for a two-speed charging process in accordance with the number of the detected batteries, comprising:
   a) a housing adapted to receive charging components, the housing having a charging groove with a charging series loop for charging a plurality of batteries, a plug extending from the housing for an electric connection to an alternating current (AC) source;
   b) an exchange power unit disposed within the housing for converting AC into DC used for charging a plurality of series-connected batteries in the charging groove, the exchange power unit being adapted to provide a reference voltage to a charging control device;
   c) a plurality of switches parallel-connected with corresponding charging loops of the batteries, a unilateral electronic element being interposed between each switch and the positive terminal of the corresponding battery; and
   d) a charging control device having a microcontroller with a time control unit and a battery quantity/voltage detection system; the time control unit being adapted to control separately the on/off state of each switch, the battery quantity/voltage detection system being adapted to detect separately the terminal voltage at a positive terminal of the batteries of the battery charging loops as well as to determine the number of the batteries to be charged, the microcontroller taking control of a voltage regulation unit and a current regulation unit, the current regulation unit being coupled to a current detection unit, whereby the charging current and voltage are determined by the number (N) of the detected batteries, and an automatic change-over to a speedy charging process is done when the number of the detected batteries is equal to or less than two while an automatic change-over to a normal charging process is done when the number of the detected batteries is more than two; in this way, a two-speed charging function can be fulfilled in accordance with the number of the batteries to allow for an automatic change-over to different charging modes.

12. A serial charger with the function of automatic change of charging speed for NiCd/NiH batteries connected in series as well as in parallel to allow for a different speed charging modes, comprising:
   a) a housing adapted to receive charging components, the housing having a groove for charging four batteries, the first two batteries being connected in series while the other two are connected in series as well, thereby forming a first and a second charging loop, a plug extending from the housing for an electric connection to an alternating current (AC) source;
   b) a plurality of switches parallel-connected with corresponding charging loops of the batteries, a unilateral electronic element being interposed between each switch and the positive terminal of the corresponding battery;
   c) an exchange power unit disposed within the housing for converting AC into DC used for charging a plurality of series-connected batteries in the charging groove, the exchange power unit being adapted to provide a reference voltage to a charging control device;
   d) a current partition unit adapted to divide the DC supplied by the exchange power unit into a first charging current and a second charging current both of which flow to the first charging loop and the second charging loop, respectively; and
   e) a charging control device having a microcontroller with a time control unit and a battery quantity/voltage detection system; the time control unit being adapted to control separately the on/off state of each switch, the battery quantity/voltage detection system being adapted to detect separately the terminal voltage at a positive terminal of the batteries of the battery charging loops as well as to determine the number of the batteries to be charged, the microcontroller taking control of a voltage regulation unit and a current regulation unit, the current regulation unit being coupled to a current detection unit, whereby the charging control device commands the current partition unit to output respectively a bigger charging current to the first charging circuit to realize an extreme speed charging and a smaller charging current to the second charging circuit to carry out the instant charging, wherein, when the batteries in the first charging circuit are fully charged, the charging current will be shifted to the second charging circuit to carry out the extreme speed charging, thereby creating a speed-changing charging mode in two phases to allow for an automatic change-over to a speedy charging process and an instant charging process.

* * * * *